(12) United States Patent
Hite

(10) Patent No.: US 12,554,600 B2
(45) Date of Patent: Feb. 17, 2026

(54) SINGLE VOTING PROCESSOR ARCHITECTURE

(71) Applicant: Bradford T Hite, Valencia, CA (US)

(72) Inventor: Bradford T Hite, Valencia, CA (US)

( * ) Notice: Subject to any disclaimer, the term of this patent is extended or adjusted under 35 U.S.C. 154(b) by 21 days.

(21) Appl. No.: 18/675,078

(22) Filed: May 27, 2024

(65) Prior Publication Data

US 2025/0363019 A1 Nov. 27, 2025

(51) Int. Cl.
*G06F 11/18* (2006.01)
*G06F 9/50* (2006.01)

(52) U.S. Cl.
CPC .......... *G06F 11/183* (2013.01); *G06F 9/5038* (2013.01)

(58) Field of Classification Search
CPC ............................ G06F 11/183; G06F 9/5038
USPC ........................................................ 714/797
See application file for complete search history.

(56) References Cited

U.S. PATENT DOCUMENTS

| | | | | |
|---|---|---|---|---|
| 5,404,499 A | * | 4/1995 | Nichols | G06F 11/366 714/E11.215 |
| 7,243,338 B2 | * | 7/2007 | Sethi | G06F 11/0769 714/E11.21 |
| 9,665,448 B2 | * | 5/2017 | Nakamura | H03K 19/007 |
| 2018/0329780 A1 | * | 11/2018 | Boettjer | G06F 11/1441 |
| 2020/0151067 A1 | * | 5/2020 | Golov | G06F 11/3013 |

* cited by examiner

*Primary Examiner* — James C Kerveros

(57) ABSTRACT

A unique system for the implementation of a hardware based task sequencer controlling a time-shared single processor executing multiple redundant software programs is described. Each fully self contained software image resides in a partitioned memory section executing exclusively without the need for a common operating system or hypervisor. The invention also enables the usage of commercially available flash memory and low cost CMOS microprocessor to implement a TMR voting architecture. Improved failure mitigation is offered by the invention thru the availability of a spare task program and data memory partition. The task sequencer, upon error detection, can switch the executing process of a failed task memory partition to the spare partition thereby allowing full voting redundancy to be maintained. Some example high reliability applications of a voting function which can be implemented with the invention include: life critical medical devices, radiation resistant satellite data processing and vehicle/aircraft automation control.

8 Claims, 6 Drawing Sheets

System Block Diagram

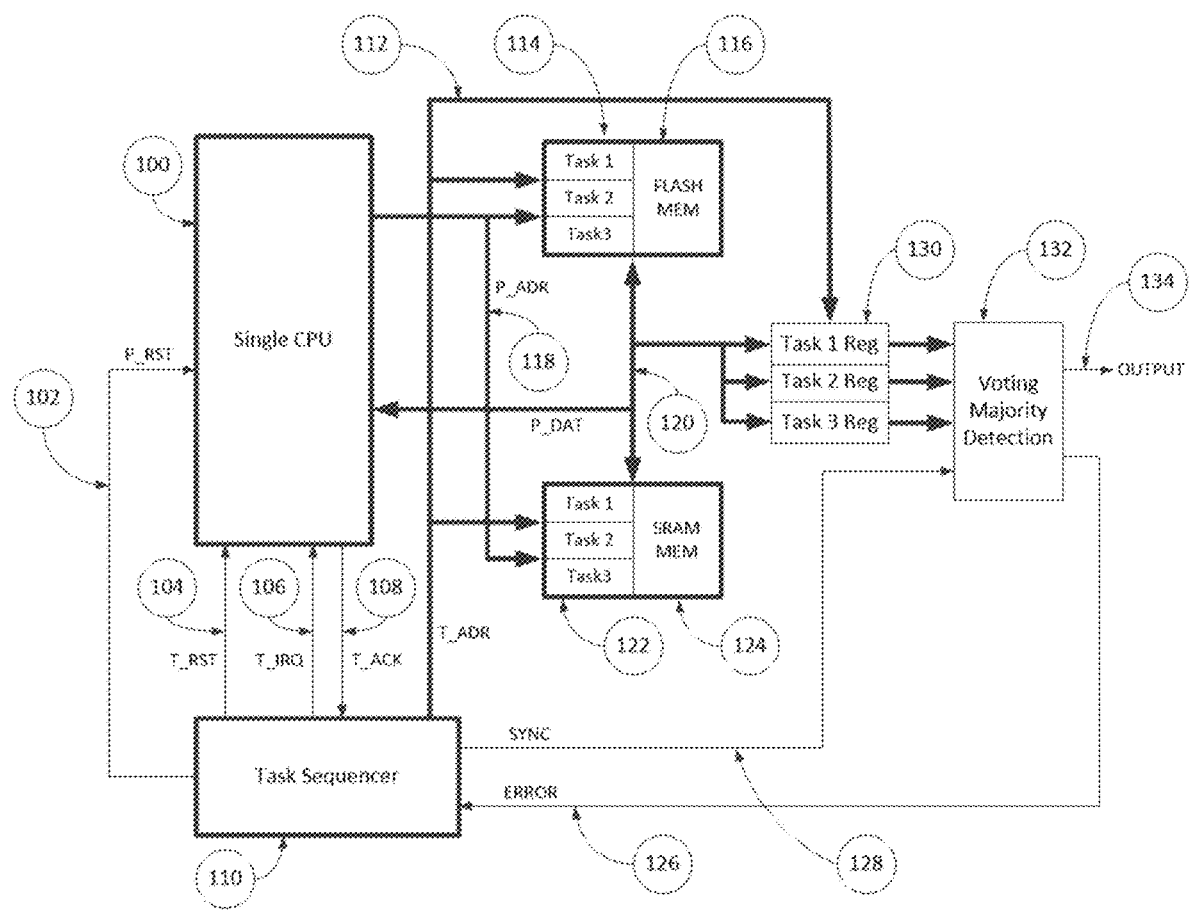
FIG 1 – System Block Diagram

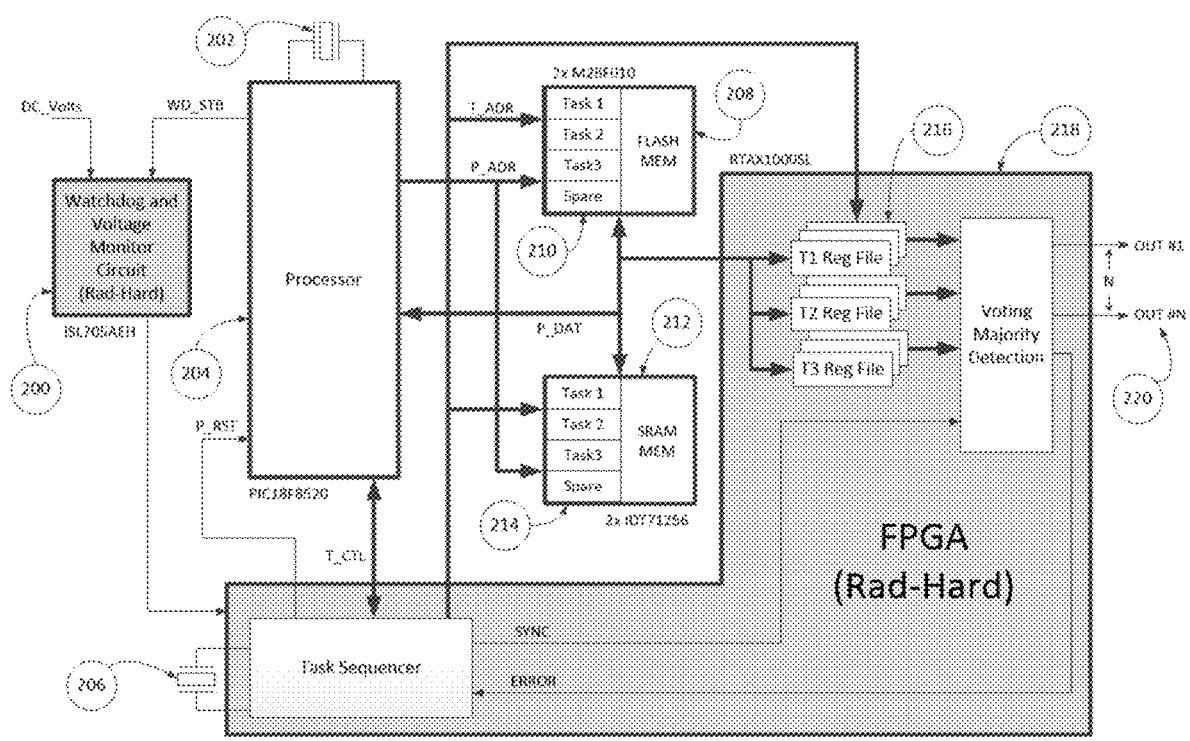
FIG 2 – Example Implementation Block Diagram Based on Radiation Hardened Components

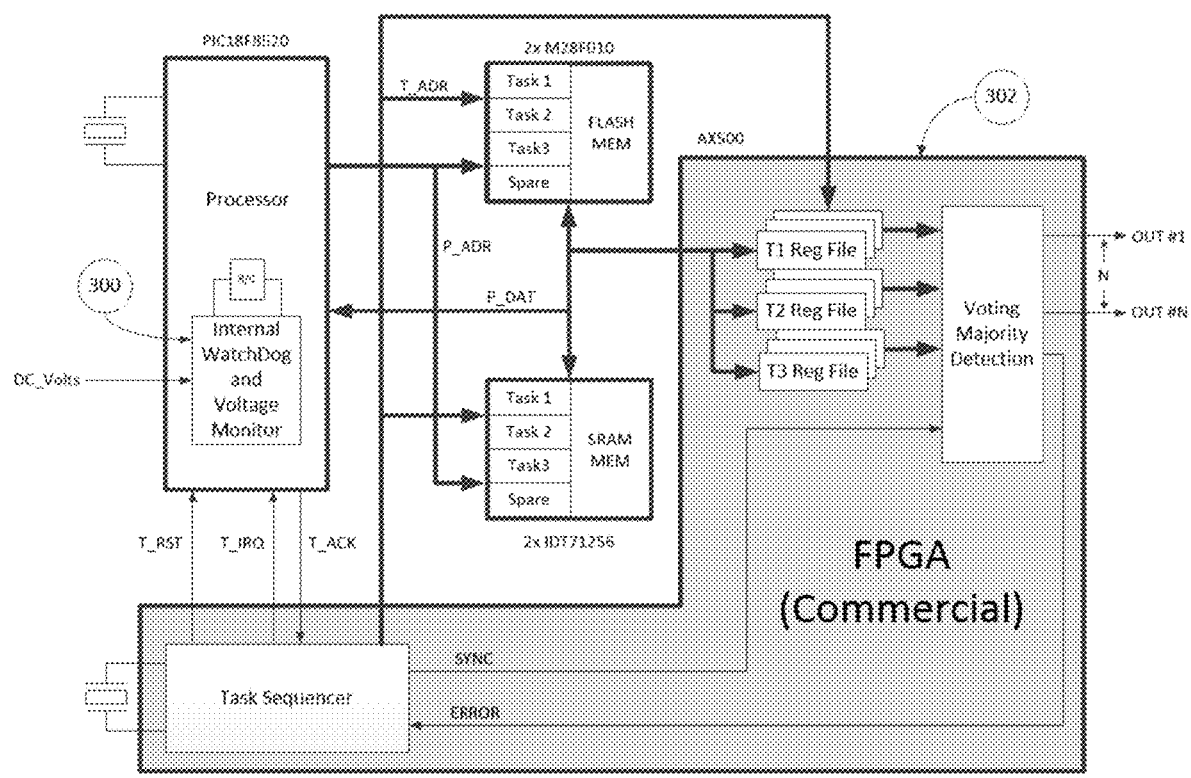
FIG 3 – Example Implementation Block Diagram Based on Commercial Components

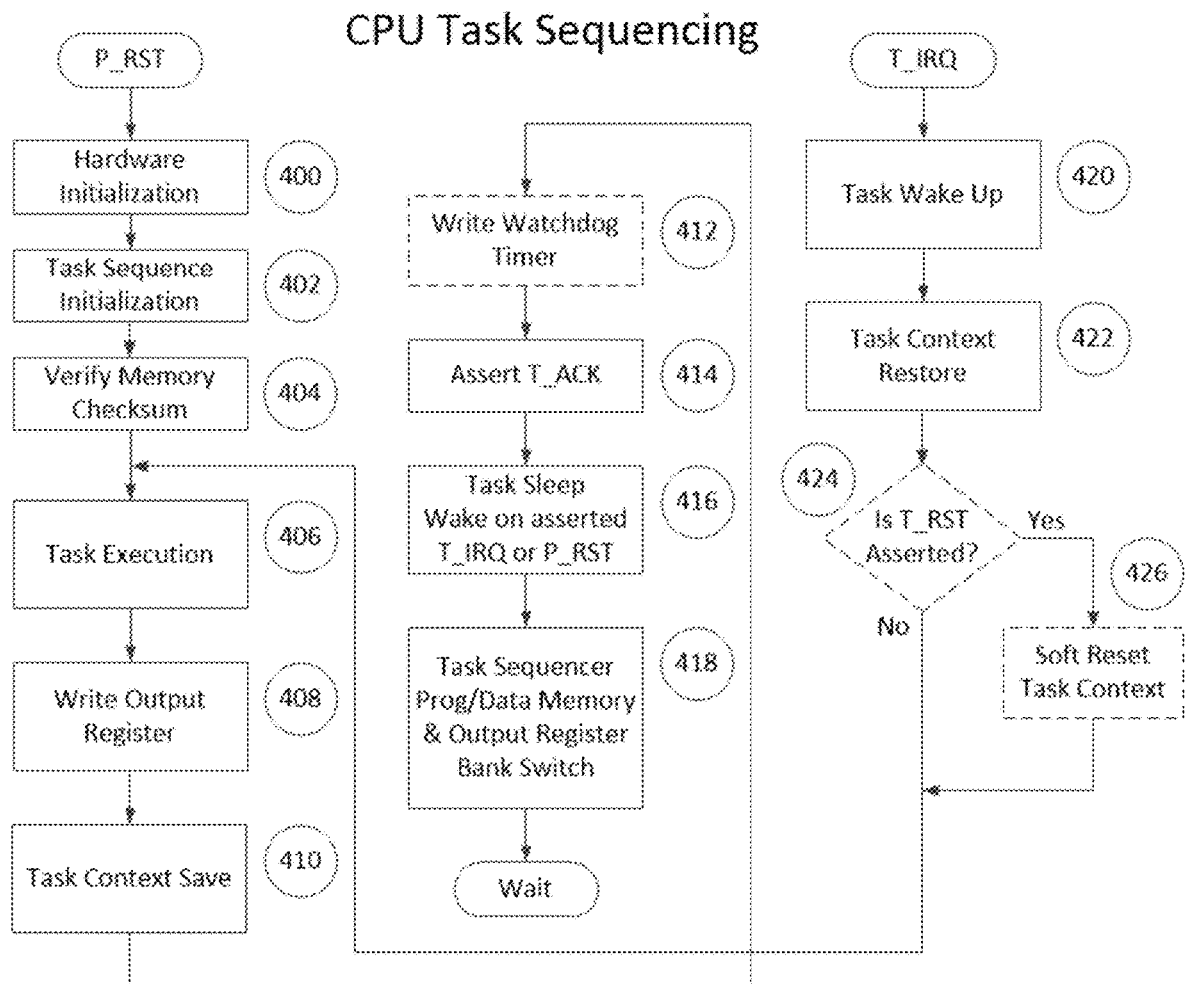
FIG 4 – Example Redundant Image Execution Flow Chart

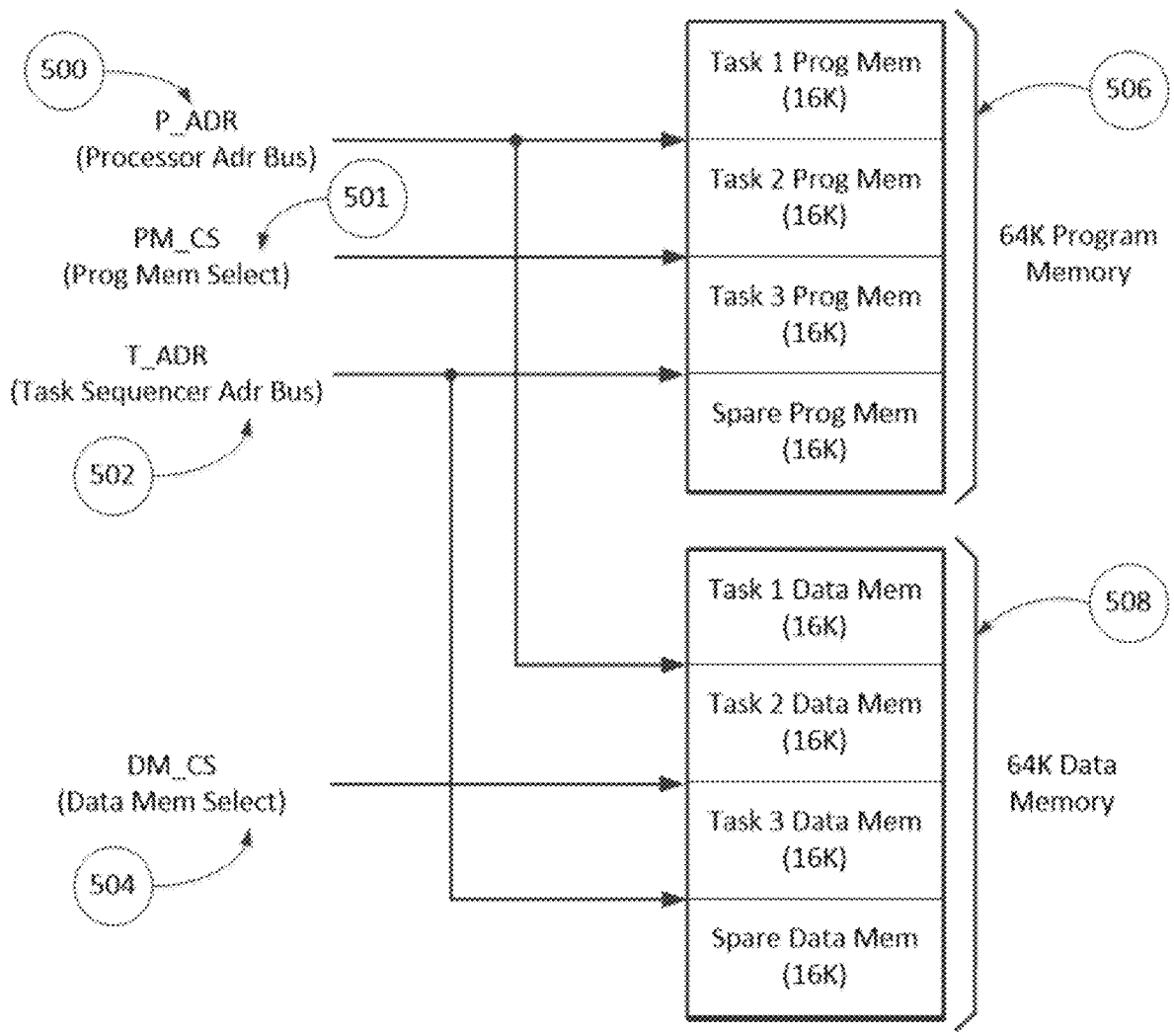
FIG 5 – Example Partitioned Program/Data Memory Map

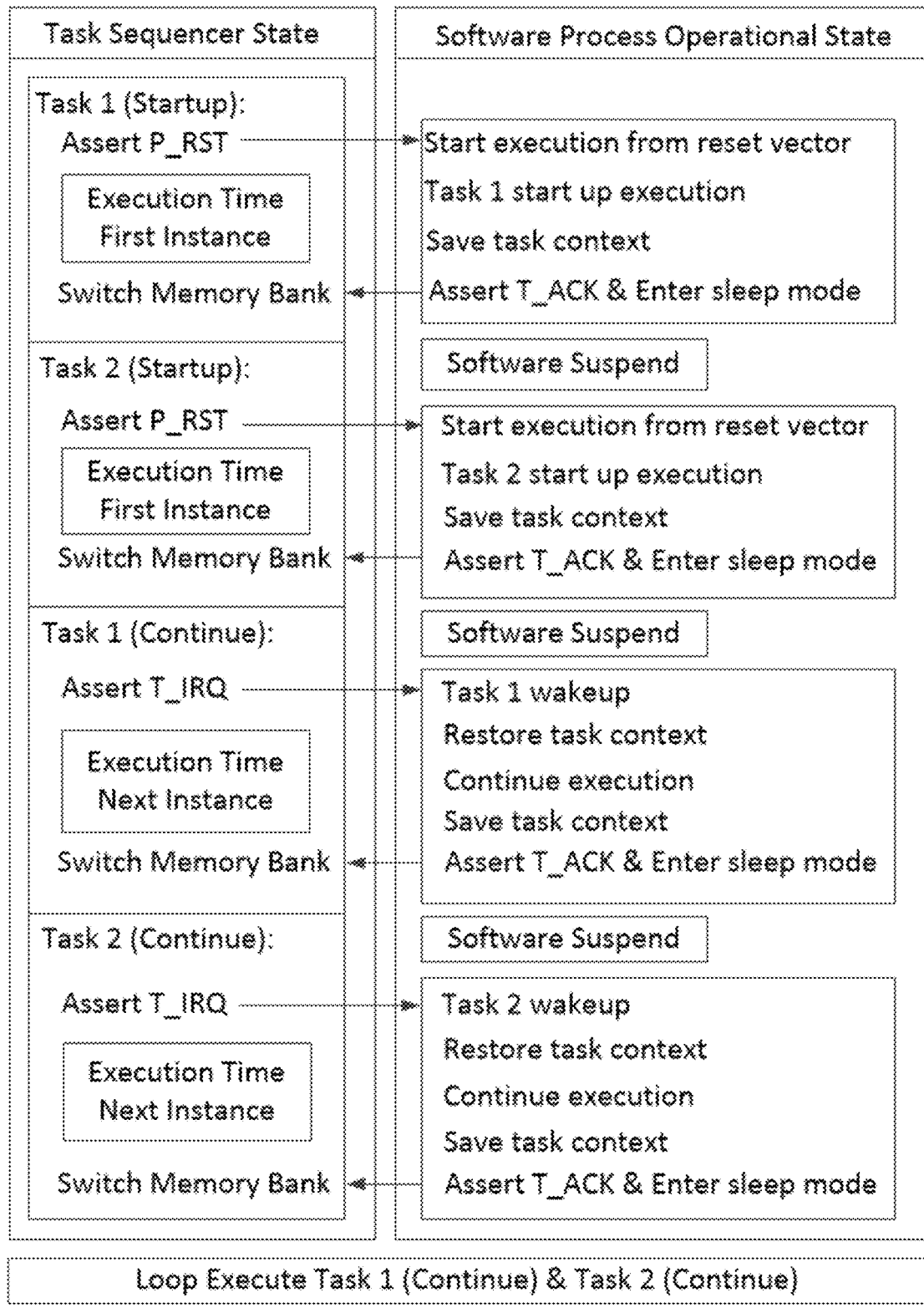
FIG 6 – Example Execution Sequence for a Two Task Configuration

SINGLE VOTING PROCESSOR ARCHITECTURE

BACKGROUND OF THE INVENTION

1. Field of the Invention

This invention relates to the field of high reliability redundant data processing embedded systems. Specifically, a method and system for the implementation of a voting function by a single processor executing multiple redundant partitioned memory software instances. The invention teaches the usage of sequential control logic to time-share a single processor within a partitioned memory whereby each executing task provides outputs to a majority voting circuit. The voting function provides safeguards against single event failures such as memory corruption and processor execution errors. Some example high reliability applications of a voting function which can be implemented with the present invention include: life critical medical devices, radiation resistant satellite data processing and vehicle/aircraft automation control.

2. Description of the Related Art

There are many known system configurations used within the high reliability data processing field. Some of the earliest work in the field was performed by R. Lyons and W. Vanderkulk at IBM during the 1960's presented in an article titled "The Use of Triple Modular Redundancy to Improve Computer Reliability". In this article, the mathematical analysis was demonstrated for a triple redundancy concept originally envisaged by Von Neumann. The Triple Modular Redundancy (TMR) system generally consists of three redundant circuits (i.e. a processor) compared against each other by a majority voting circuit. Given the case of a difference, the minority circuit result can be ignored and the output remains error free. Data processing redundancy methods can be implemented using various system components including: hardware, software, information and time. An example of each type of these redundancies respectively could be: redundant processors executing the same program, different versions of software calculating a result, error correcting codes for a memory and time sequenced processors executing the same program. Each of these example implementations has been described in the prior art. Interestingly, one of the earliest application examples of a TMR computer system was implemented for the Saturn launch vehicle starting in 1961.

An early patent involving triple redundancy was filed by Kreis et al in U.S. Pat. No. 3,921,149 titled "Computer Comprising Three Data Processors" (19 Nov. 1975). This concept involves three processors having no common circuitry operating in parallel accessing a common memory. Outputs from the three processors are compared using a majority gate circuit whereby the faulty processor (non-majority) is rendered inactive and a failure indication is given. The operation of the three processors is synchronized to simultaneously process consecutive instructions of the program. The output from the processed instruction based on the majority of processors is transferred back into the memory. The system taught by Kreis differs from the present invention since being based on multiple processors accessing a common memory.

Another early patent involving multi-processor redundancy was filed by Marshall et al in U.S. Pat. No. 5,915,082 titled "Error Detection and Fault Isolation for Lockstep Processor Systems" (22 Jun. 1999). This concept involves two processors (master and slave) processing independently clock synchronized lockstep execution of the same task. Marshall teaches a classical dual lockstep processor consists only of a master monitored by a slave comparing only outputs between the two. The system of Marshall adds monitoring of both processor(s) input/output signals using parity thereby enabling a more complete fault recovery mechanism. As before, the system taught by Marshall differs from the present invention since based on multiple processors accessing a common memory.

More recently, De Oliveria et al proposed a triple processor system executing the same application software in U.S. Pat. No. 10,095,601 B2 titled "Triple Software Redundancy Fault Tolerant Framework Architecture" (9 Oct. 2018). In this system, De Oliveria teaches a multi-core processor having independent dedicated cores execute the same application in separated/isolated memory segments under the synchronization of a common hypervisor. The hypervisor is described as an executable software program serving in a simplified capacity to an operating system but with a much smaller memory footprint. During execution, the hypervisor synchronizes processing and data transactions between the concurrent application instances. De Oliveria further proposes a distributed software majority voting scheme as opposed to majority circuit or parity comparisons. Again, this system differs from the current invention in aspects of: multiple processors, a software based hypervisor providing memory management and a distributed voting scheme.

The above cited prior art references all pertain to multiple processors executing the same software application from a common or partitioned memory. This is different from the present invention which teaches a single processor executing the same software application from a partitioned memory in a time-shared manner. A similar method of operation was proposed by Estaves et al in FR 11 00688 A1 titled "Device for improving the fault tolerance of a processor" (12 Jul. 2013). In the system of Estaves, a single processor is described as performing parallel execution of multiple instances of an application. Application instances are executed in turn for a given period of time. Estaves describes a hypervisor comprising means for executing several instances of an application in parallel. The hypervisor is further described comprising a software layer which virtualizes the hardware resources pertaining to processor registers and memory. The present invention improves upon the system of Estaves by eliminating the hypervisor software layer with a radiation resistant hardware based task sequencer circuit. A radiation induced single event fault during execution of the hypervisor software component would cause the system to fail setting off the watchdog timer generating a reset. Further, the hypervisor software controls the majority voting comparison of redundant generated application outputs and execution recovery/termination of a detected faulted application. The present invention offers improvements by moving these functions into radiation resistant hardware thereby eliminating system prone failures susceptible by the non-redundant hypervisor software component.

BRIEF SUMMARY OF THE INVENTION

The present invention comprises a hardware based task sequencer circuit controlling a time-shared single processor executing multiple redundant software programs. Each fully self contained software image resides in a partitioned memory section executing exclusively without the need for a common operating system or hypervisor. This configuration eliminates the single point failure of having supervisory software scheduling or controlling execution of a multi-tasking system. A single event upset (SEU) or single event error (SEE) occurring during the supervisory software execution period can cause a system failure. The present invention also enables the usage of commercially available flash memory and low cost CMOS microprocessor to implement a TMR voting architecture. The goal to use these type components provides a large cost savings compared to radiation hardened or military grade components. Further failure mitigation is offered by the present invention thru the availability of a spare task program and data memory partition. The task sequencer circuit, upon error detection, can switch the executing process of a failed task memory partition to the spare partition thereby allowing full voting redundancy to be maintained. Another topology can utilize the spare memory partition to execute a non-voting task time shared with the voting TMR tasks. Sequencing of multi task time-sharing is performed by the task sequencer circuit using external interrupts and the processor reset signal. Each task replicates a fully independent reset, interrupt response and context save/restore capability supporting hardware control. This flexible scheme of independent reset or continual execution of each task allows the task sequencer circuit to perform error detection and mitigation. The present invention enables a high reliability single processor architecture based upon low cost commercial components.

BRIEF DESCRIPTION OF THE DRAWINGS

FIG. 1 is a system block diagram for the present invention.

FIG. 2 is an example block diagram for implementation of the invention based on radiation hardened electronics.

FIG. 3 is an example block diagram for implementation of the invention based on commercial electronics.

FIG. 4 is an example flow chart detailing the process steps taken to execute time shared redundant images within a partitioned memory.

FIG. 5 details an example partitioned program/data memory map

FIG. 6 details an example state diagram for the execution sequence of a two task configuration

REFERENCE NUMERALS IN THE DRAWINGS

| 100 | Single Processor Executing Memory Images | 102 | Processor Reset Signal |
| --- | --- | --- | --- |
| 104 | Task Reset Signal | 106 | Task Interrupt Request Signal |
| 108 | Task Interrupt Acknowledge Signal | 110 | Task Sequencer Control Logic Circuit |
| 112 | Task Sequencer Memory Address Bus | 114 | Task Executable Images Within Program Memory |
| 116 | Program Memory Circuit | 118 | Processor Address Bus |
| 120 | Processor Data Bus | 122 | Task Data Storage Regions Within Data Memory |
| 124 | Data Memory Circuit | 126 | Majority Detection Error Signal |
| 128 | Majority Detection Synchronization Signal | 130 | Task Output Register Circuits |
| 132 | Voting Majority Detection Logic Circuit | 134 | Majority Output Value |

REFERENCE NUMERALS IN THE DRAWINGS (continued)

| 200 | Radiation Hardened Watchdog and Voltage Monitor Circuit | 202 | CPU Clock Generation Oscillator |
| --- | --- | --- | --- |
| 204 | Single Processor Executing Memory Images | 206 | Task Sequencer Control Logic Clock Generation Oscillator |
| 208 | Flash Memory Device | 210 | Spare Task Executable Image Within Program Memory |
| 212 | SRAM Memory Device | 214 | Spare Task Data Storage Within Data Memory |
| 216 | Task Redundant Output Register File | 218 | Radiation Hardened Logic FPGA |
| 220 | Multiple Majority Output Values | | |
| 300 | Internal CPU Watchdog and Voltage Monitor With R/C Oscillator | 302 | Commercial Grade Logic FPGA |
| 400 | Process Step for Hardware Initialization | 402 | Process Step for Task Sequence Initialization |
| 404 | Process Step for Task Execution | 406 | Process Step for Writing to the Output Register |
| 408 | Process Step for Task Context Cleanup | 410 | Process Step for Writing to the Watchdog Timer |
| 412 | Process Step for Task Sleeping State | 414 | Process Step for Task Sequencer Memory and Output Register Context Switch |
| 416 | Process Step for Task Interrupt Request Execution | 418 | Process Step for Task Wake Up |
| 420 | Process Step for Task Context Setup | 422 | Decision Step to Perform a Task Reset |
| 424 | Process Step for Resetting of Task Context | 426 | Process Step for Sending Task Interrupt Acknowledge Signal |
| 500 | Processor Address Bus | 501 | Program Memory Section Select |
| 502 | Task Sequencer Address Bus | 504 | Data Memory Section Select |
| 506 | Program Memory | 508 | Data Memory |

DETAILED DESCRIPTION OF THE INVENTION

The preferred embodiment system block diagram of the present invention is shown in FIG. 1 as a generalized computer architecture. The main elements of the system include Processor 100, Program Memory 116, Data Memory 124, Task Sequencer Circuit 110 and Majority Voting Circuit 132. These elements as shown in FIG. 1 are connected by address/data buses and control signals necessary to implement the present invention. Processor 100 contains a single CPU having an address bus P_ADR 118, a data bus P_DAT 120 and various control lines. The group of task control information signals coupling Task Seq circuit 110 to Processor 100 are shown as reset P_RST 102, interrupt request T_IRQ 106, interrupt status T_ACK 108 and task reset T_RST 104. Processor 100 can be implemented using any type of CPU having minimal capabilities of reset, interrupt control and sleep mode. Optionally, a control line for requesting a task soft reset T_RST 104 can be implemented. Processor 100 under control of hardware Task Seq 110 executes multiple Task Image(s) 114, depicted as Task 1, Task 2 and Task 3, located within separate partitions of Prog Mem 116. Prog Mem 116 can be any type of non-volatile memory including but not limited to Flash, EEPROM, EPROM and Mask-ROM programmed technologies. Each Task Image 114 can contain redundant copies of the same software information as an executable image or different images depending on the application needs. Further, each Task Image 114 in Prog Mem 116 has an associated Data Area 122 in Data Mem 124 for storage of such data information items as stack, heap, variables and task context. Data Mem 124 can be any type of volatile memory including but not limited to SRAM, DRAM or FRAM technologies. Memory locations within Prog Mem 116 and Data Mem 124 are addressed by Task Seq 110 address bus T_ADR 112 and Processor 100 address bus P_ADR 118. T_ADR 112 address bus selects the active Task Image 114 and Data Area 122 regions within memory for access by Processor 100. P_ADR 118 address bus and P_DAT 120 are controlled by Processor 100 during the execution of an active task to access instructions/data within the task memory partition. The access of task memory regions by Processor 100 are controlled/partitioned by Task Sequencer 110 thereby providing complete isolation between tasks. One key aspect of the present invention is Task Sequencer 110 can be implemented as a hardware state machine thereby not requiring operating system or hypervisor software components. Processor 100 is controlled by Task Sequencer 110 thru usage of reset signal P_RST 102 and interrupt signal T_IRQ 106. P_RST 100 is asserted commanding Processor 100 to execute reset or startup instructions, T_IRQ 106 is asserted commanding Processor 100 to continue execution of the active task as selected by Task Sequencer 110. Status signal T_ACK 108 can be used by Processor 100 to indicate the active task context has been saved and the processor has entered a sleep mode. Entering sleep mode causes Processor 100 to suspend execution thereby allowing Task Seq 110 to safely select the next active task by updating the T_ADR 112 address bus. Following the T_ADR 112 update, the Task Seq 110 will assert T_IRQ 108 allowing execution of the next active task to continue. Further, in case of error detection the task reset signal T_RST 104 can be asserted aligned with T_ACK 108 to perform a soft reset of the next active task. The P_RST 102 signal can also be asserted by Task Seq 110 to initiate a complete task re-start for a critical execution error. An example of this type of error could be a watch dog timer time-out event whereby the time duration between T_IRQ 106 and T_ACK 108 exceeds a predetermined threshold. In addition to each task having a partitioned program/data memory section, an Output Reg 130 is available as input to the Voting Majority Detection 132 circuit. The current active task writes output information into Output Reg 130 for a voting comparison against the other task outputs. An example of this operation would consist of the following steps: 1) Processor 100 under the control of Task Seq 110 executes Task 1 with associated output information written to Task 1 Reg, 2) Processor 100 under the control of Task Seq 110 executes Task 2 with associated output information written to Task 2 Reg, 3) Processor 100 under the control of Task Seq 110 executes Task 3 with associated output information written to Task 3 Reg, 4) Synchronization trigger SYNC 128 is asserted to indicate all output information is currently ready for comparison, 5) Voting Majority Detection circuit writes the majority output information to OUTPUT 134 and 6) Detection of a non-majority task output value is reported to Task Seq 110 using signal ERROR 126. Task Seq 110 can perform a soft reset or full reset of the non-majority task using the T_RST 104 or P_RST 102 respectively as required.

An example of an electrical implementation of the preferred embodiment using radiation hardened components is shown in FIG. 2. In this configuration, radiation hardened components are used for critical hardware circuits of watch dog, output register files, voting majority detection and task sequencer. These critical hardware circuits provide error detection and control oversight for circuits performing the execution of software. Given this oversight, circuits involved in the execution of software can utilize non-radiation hardened extended range temperature grade parts. In this configuration the following parts are utilized: Watchdog Voltage Monitor 200 is an Intersil ISL705AEH space grade part, Processor 204 is a PIC18F8520 extended grade part, Logic FPGA 218 is a Microsemi RTAX1000SL space grade part, Program Memory 208 is a Intel M28F010 flash memory military grade part and Data Memory 212 is an Integrated Device Technology IDT71256 SRAM memory military grade part. Crystal oscillator modules 202 and 206 provide clock frequency inputs to Processor 204 and FPGA 218 Task Sequencer function respectively. FIG. 2 further details additional features of the preferred embodiment not shown in FIG. 1 for clarity. The first is an optional watchdog circuit 200 is included to monitor CPU execution and input voltage levels. In the event of either condition for out-of-range input voltage or watchdog strobe signal WD_STB timeout a processor reset is generated by signal P_RST. Secondly, Spare Memory Partitions 210 & 214 has been included to both Program Memory 208 and Data Memory 212 respectively. This spare partition can be utilized, for example, as a backup redundant voting software task or to implement a non-voting software task. The spare redundant voting task partition could be used to replace a faulted task based on errors detected during output information comparisons. One example would be the repeated failure of a specific voting task to produce a majority output whereby its execution would be terminated and replaced with the spare task. Finally, task output Register File(s) 216 has been included to support multiple output information values from each task. The voting majority detection circuit will compare multiple output information values to produce multiple majority output information 220.

Another example of an electrical implementation of the preferred embodiment using a mix of extended temperature and commercial components is shown in FIG. 3. Commercial grade component usage in a space application will require environmental controls due to their operating temperature range typically being −40 C to +85 C. In this implementation, the external watchdog component has been replaced by an Internal Watchdog 300 function integrated within the extended temperature grade processor. Further, the logic FPGA 302 component is replaced by an industrial grade Microsemi AX500 part. The configuration shown in FIG. 3 contains the additional preferred embodiment features included in FIG. 2.

FIG. 4 shows an example flow chart of the process steps involved in the startup and continual execution of time-shared tasks. All of the process steps shown in FIG. 4 are performed by Processor 100 with the exception of step 418 which is handled by Task Seq circuit 110 during processor sleep mode. Upon processor reset signal P_RST being asserted, a software initialization (start-up) sequence is executed using a reset vector within the task program memory partition. Each program memory partition contains an entire self contained executable image for each task including vector tables as selected by Task Seq circuit 110. Step 400 first performs task specific hardware initialization, Step 402 continues to initialize the task runtime operation, and Step 404 finally calculates a checksum for the program memory partition to ensure image integrity. In the event a checksum failure occurs, many options are available for error mitigation. One example method to handle this critical error could include: Processor 100 can halt the task, 2) the condition is reported to the Task Seq circuit 110 and 3) the spare task memory partition would replace the failed partition. Step 406 performs the time-slice execution of the active task whereby output information is written into output register(s) during Step 408. Task context saving is performed by Step 410 prior to entering a sleep mode where execution is suspended. The task context can include but is not limited to stack pointer, control/status register and other configuration information critical to the task. After the context saving, the optional watchdog timer is strobed during Step 412 and signal T_ACK is asserted in Step 414. T_ACK informs Task Seq 110 that Processor 100 has entered a safe state whereby the task memory partition can be changed. Step 416 places Processor 100 in a sleep mode whereby all execution activity has been suspended and external control/bus lines are maintained in a static state. The sleep mode is exited upon the assertion of T_IRQ to continue task execution or P_RST to reset the active task. Assertion of T_IRQ typically would initiate execution of an interrupt vector or simply continue execution following the sleep instruction. Task sleep mode is exited to continue execution by first waking up the task in Step 420 with Step 422 following to restore the saved task context. Optionally, Step 424 would next check for the assertion of processor input control T_RST to generate a soft task reset in Step 426. The soft task reset does not jump to the reset vector thereby offering an error recovery option separate to complete re-start of the task.

FIG. 5 shows an example memory map access controlled by Task Seq circuit 110 and Processor 100. Program Memory 506 with 64K total locations is broken down into four partitions each containing 16K. Task Seq 110 address bus T_ADR 502 selects the active partition whereby Processor 110 address bus P_ADR 500 selects a location within a partition. One aspect of the present invention is the full hardware isolation of each partition fully eliminating task to task interaction or possible corruption. A similar addressing methodology is used for Data Memory 508 having the same size in total and for each partition. In this example, both Program Memory 506 and Data Memory 508 contain four partitions labeled as Task 1, Task 2, Task 3 and Spare. The three task partitions can be used to implement a TMR topology while the spare partition can serve either as a failed partition redundant backup or independent non-voting task. The selection of program memory or data memory access is controlled by Processor 100 output signals PM_CS 501 and DM_CS 504. The memory region hex addresses as selected by PM_CS/DM_CS, T_ADR and P_ADR are shown in the lower table from FIG. 4. Here it can be seen the P_ADR space for each partition repeats and appears identical to Processor 100.

FIG. 6 details an example state diagram for interaction between Task Seq 110 and Processor 100 for states of task "Startup" and "Continue" execution. This example details a two-task configuration for clarity but is applicable to a larger number of concurrent time-shared task(s). As described with reference to FIG. 4, a task "Startup" state is initiated by assertion of P_RST and a task "Continue" state is initiated by assertion of T_IRQ. FIG. 6 shows the execution progression of how Task 1 "Startup" state is initiated by Task Seq 110 asserting P_RST causing the task to start from the reset vector. Following task 1 startup execution, the task will save context, assert T_ACK and enter sleep mode. T_ACK informs Task Seq 110 that Processor 100 has entered an execution suspend sleep mode whereby the partition can be changed. Task Seq 110 will now update T_ADR to select the Task 2 memory partition and generate another P_RST signal. Task 2 will follow the same steps as described for Task 1 above ending in a sleep mode. Next, Task Seq 110 will update T_ADR to select the Task 1 memory partition and assert T_IRQ to enter a task 1 "Continue" state. The "Continue" state consists of task wakeup, restoring context, task execution, saving context, asserting T_ACK and entering sleep mode. Task Seq 110 will now update T_ADR to select the Task 2 memory partition and assert T_IRQ to enter a task 2 "Continue" state. Continuing from this point, Task Seq 110 alternatingly selects either a task 1 or task 2 "Continue" state as normal operation. Upon detection of a failure or error condition this sequence will be altered as necessary for fault mitigation.

Implementation of an example TMR function using the present invention will now be discussed with reference to FIG. 1. TMR requires the generation of three independent outputs from three redundant processing elements as described in the art. For this example, program memory partition(s) 114 Task 1, Task 2 and Task 3 each will contain an identical software image executed in a time-shared manner. Program and data memory partitions are completely isolated by addressing performed by the task sequencer circuit 110. Under normal operation, all of the tasks will execute in a round-robin manner writing output information to a dedicated output register. Each task will enter a sleep mode induced execution suspend state at the same program counter location. This allows the task sequencer circuit 110 to simply switch the partition and continue the next task execution. When all tasks have output an updated value, the task sequencer will assert SYNC 128 informing the voting majority detection circuit to calculate majority output information. Error free majority output is obtained when each of the output registers contain the same value. In the event a difference (non-majority) condition is detected, the majority value is output and ERROR 126 is asserted to identify the non-majority contributor. Initially, the task sequencer circuit 110 can issue a soft reset interrupt 104 in an attempt to clear the error or just assert the processor 102 reset to restart a task. Resetting of processor 100 due to error detection will only affect the current task causing a restart and again entering sleep mode as described above ready to resume time-shared operation. This type of operation is fully supported by the PIC18F8520 whereby a processor reset only forces execution to jump to a reset vector. No other context is affected except under application software control.

The claimed invention is:
1. A high reliability processor system comprising:
 a. a task sequencer circuit coupled to a processor executing software, the task sequencer circuit generating task control information in response to the processor;
 b. a processor coupled to a non-volatile program memory and a volatile data memory, the processor executing software in response to the non-volatile program memory and generating data information in response to the volatile data memory;
 c. a non-volatile program memory coupled to the processor and the task sequencer circuit, the non-volatile program memory generating software information in response to the processor and task sequencer circuit;

d. a volatile data memory coupled to the processor and the task sequencer circuit, the volatile data memory generating data information in response to the processor and task sequencer circuit;
e. a set of output register circuits coupled to the processor and the task sequencer circuit, the set of output register circuits containing output data information in response to the processor and task sequencer circuit;
f. a voting majority detection circuit coupled to the set of output register circuits and coupled to the task sequencer circuit, the voting majority detection circuit generating majority output information and an error signal indicating any difference condition in response to the set of output register circuits and the task sequencer circuit;
g. wherein the task sequencer circuit is configured to select a partition of non-volatile program memory and volatile data memory accessible by the active task;
h. wherein the processor is configured to access the non-volatile program memory and volatile data memory partition selected by the task sequencer circuit; and
i. wherein the task control information generated by the task sequencer circuit is configured to control the processor execution state.

2. The system of claim 1, wherein the non-volatile program memory and volatile data memory are configured into at least three partitions containing the same software.

3. The system of claim 1, wherein the non-volatile program memory and volatile data memory are configured to contain at least one spare partition.

4. The system of claim 1, wherein the software is configured to perform a checksum based integrity test on program memory.

5. A method of high reliability processing comprising:
a. generating task control information by a task sequencer circuit in response to a processor executing software;
b. executing software by a processor in response to a non-volatile program memory;
c. generating data information by a processor in response to a volatile data memory;
d. generating software information by a non-volatile program memory in response to a processor and a task sequencer circuit;
e. generating data information by a volatile data memory in response to a processor and a task sequencer circuit;
f. containing output data information by a set of output register circuits in response to a processor and a task sequencer circuit;
g. generating majority output information and an error signal indicating any difference condition by a voting majority detection circuit in response to the set of output register circuits and the task sequencer circuit;
h. selecting a partition of non-volatile program memory and volatile data memory accessible to the active task by a task sequencer circuit in response to task control information;
i. accessing non-volatile program memory and volatile data memory partitions by a processor in response to a task sequencer circuit; and
j. controlling a processor execution state by a task sequencer circuit in response to task control information.

6. The method of claim 5, further comprising containing the same software in at least three partitions of non-volatile program memory and volatile data memory.

7. The method of claim 5, further comprising containing at least one spare partition in non-volatile program memory and volatile data memory.

8. The method of claim 5, further comprising performing a checksum based integrity test on non-volatile program memory.

* * * * *